United States Patent [19]
Crawford et al.

[11] Patent Number: 4,714,997
[45] Date of Patent: Dec. 22, 1987

[54] DATA REDUCTION IN REPROJECTION SYSTEMS

[75] Inventors: Carl R. Crawford; David A. Freundlich, both of Haifa, Israel

[73] Assignee: Elscint Incorporated, Boston, Mass.

[21] Appl. No.: 859,236

[22] Filed: May 6, 1986

Related U.S. Application Data

[63] Continuation of Ser. No. 500,347, Jun. 2, 1983, abandoned.

[51] Int. Cl.$^4$ ............................................. G06F 15/42
[52] U.S. Cl. .................................. 364/414; 378/901
[58] Field of Search ....................... 364/414; 378/901

[56] References Cited

U.S. PATENT DOCUMENTS

| | | | |
|---|---|---|---|
| 4,217,641 | 8/1980 | Naparstek ........................... | 364/414 |
| 4,219,876 | 8/1980 | Mizutani et al. ..................... | 364/414 |
| 4,222,104 | 9/1980 | Moore ................................. | 364/414 |
| 4,223,384 | 9/1980 | Hounsfield et al. ................. | 364/414 |
| 4,433,380 | 2/1984 | Abele et al. ......................... | 364/414 |
| 4,482,958 | 11/1984 | Nakayama et al. ................. | 364/414 |

OTHER PUBLICATIONS

Glover, G. H., "An Algorithm for the Reduction of Metal Clip Artifacts in CT Reconstruction", *Medical Physics*, vol. 8, No. 6, Nov. 1981, 799-807.

Henrich, G., "A Simple Computational Method for Reducing Streak Artifacts in CT Images", *Computed Tomography*, vol. 4, 1981, 67-71.

Peters, T. M., "Algorithms for Fast Back- and Re-Projection in Computed Tomography", *IEEE Transactions on Nuclear Science*, vol. NS-28, No. 4, Aug. 1981, 3641-3647.

"A Framework for Spectral Artifact Corrections in X-Ray CT", by J. P. Stonestrom, R. E. Alvarez, and A. Macovski, *IEEE Transactions on Biomedical Engineering*, vol. BME-28, No. 2, Feb. 1981, 128-141.

Heffernan, Patrick B. et al., "Image Reconstruction from Incomplete Data: Iterative Reconstruction-Reprojection Techniques", *IEEE Trans. on Biomedical Engineering*, vol. BME-30, No. 12, Dec. 1983, 838-41.

Nassi, Menahem, et al., "Iterative Reconstruction-Reprojection: An Algorithm for Limited Data Cardiac-Computed Tomography", *IEEE Trans. on Biomedical Engineering*, vol. BME-29, No. 5, May 1982, 333-341.

Walters, Timothy E. et al., "Attenuation Correction in Gamma Emission Computed Tomography", *Journal of Computer Assisted Tomography*, vol. 5, No. 1, Feb. 1981, 89-94.

Harris, L. D. et al., "Display and Visualization of Three-Dimensional Reconstructed Anatomic Morphology: Experience with the Thorax, Heart and Coronary Vasculature of Dogs", *Journal of Computer Assisted Tomography*, vol. 3, No. 4, Aug. 1979, 439-446.

*Primary Examiner*—Jerry Smith
*Assistant Examiner*—Clark A. Jablon
*Attorney, Agent, or Firm*—Sandler & Greenblum

[57] ABSTRACT

Systems and methods are presented for decreasing the processing time of spectral artifact reduction systems that use reprojection data for post reconstruction corrections. The systems and methods essentially reduce the data processed for the reprojection step to reduce the normally relatively long time period required by reprojectors. The time savings have no detrimental effect on image resolution. Thus, better quality pictures are obtained in shorter time periods.

7 Claims, 4 Drawing Figures

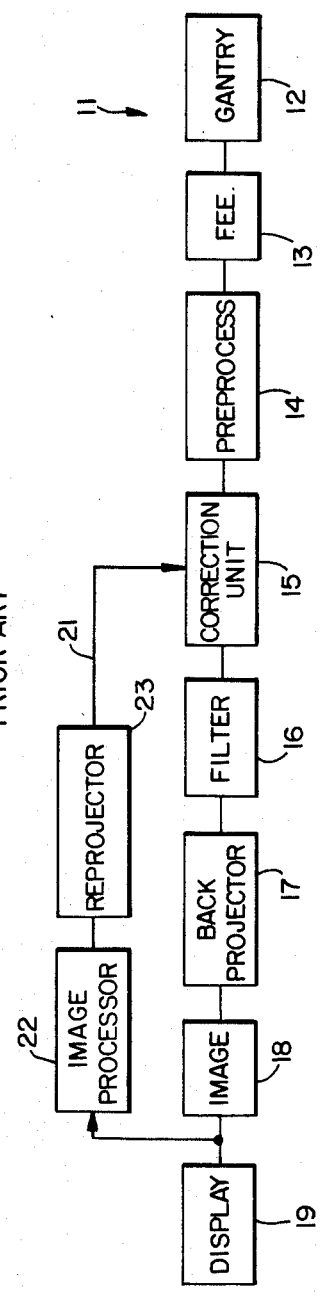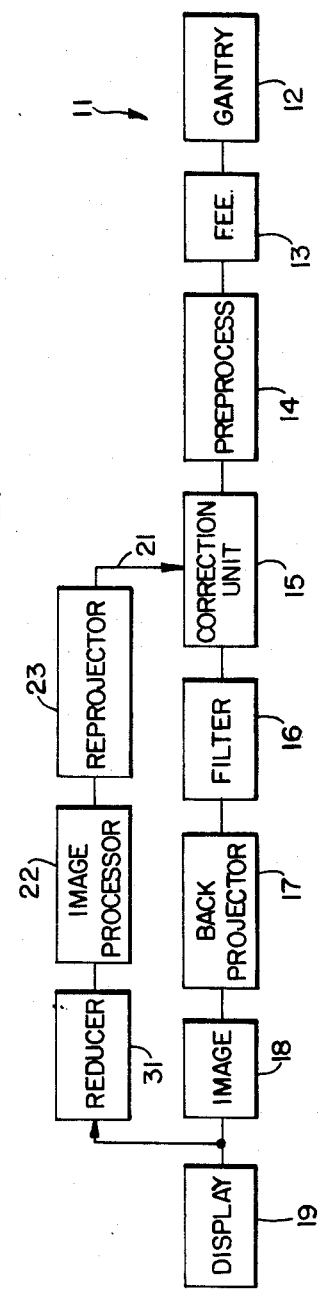

DATA REDUCTION IN REPROJECTION SYSTEMS

This application is a continuation of application Ser. No. 500,347, filed June 2, 1983, abandoned.

FIELD OF THE INVENTION

This invention is concerned with computer-generated images and more particularly with systems for reprojecting such images for artifact correction or other purposes.

BACKGROUND OF THE INVENTION

This invention is related to the invention of a patent application filed on Apr. 21, 1983, bearing Ser. No. 487,310, now U.S. Pat. No. 4,626,991 and to the invention of a patent application filed on June 7, 1983, bearing Ser. No. 501,832, now U.S. Pat. No. 4,616,318. Both inventions are assigned to the assignee of this invention.

The evolution of x-ray computed tomography (CT) has produced scanners with decreasing data acquisition and image reconstruction times and improved density, and spatial resolutions. The improvements have been achieved primarily by the use of more sophisticated data acquisition systems and faster image reconstruction hardware. The image quality has also been improved by reevaluating assumptions made in order to build the early generations of CT scanners and to incorporate corrections and/or refinements in these assumptions within the image reconstruction algorithm. These assumptions were initially made in order for the date collected by an actual scanner to be compatible with theoretical reconstruction algorithms.

An example of these assumptions has to do with the spectrum of the x-ray source and the energy dependence of the attenuation coefficients of different elements of the object under examination. An important assumption used in the past to produce images is that the source is monochromatic or that the energy dependence of the attenuation coefficients is identical for all elements. It is well known that neither of these two conditions is satisfied and hence what is known as polychromatic artifacts are produced in resulting images. The artifacts can be identified as cupping and as negative streaks between sharp objects that have high attenuation coefficients.

The prior art, see for example U.S. Pat. No. 4,217,641, uses an iterative post-reconstruction method to reduce the level of polychromatic artifacts. Among other known prior art describing polychromatic artifact correction techniques are: U.S. Pat. Nos. 4,222,104 and 4,223,384 as well as an article entitled "A Framework for Spectral Artifact Corrections in X-ray Computed Tomography," by J. Peter Stonestrom, et. al., in the IEEE Transactions on Biomedical Engineering, Vol. BME-28, No. 2, Feb. 1981.

The basis of these prior art post-reconstruction correction methods is that objects are made up of two approximately homogeneous components with respect to the energy dependence of their attenuation coefficients. In biological applications the two components are bone and soft tissue. An initial image is reconstructed incorporating first-order polychromatic corrections for the majority element, usually soft tissue. The initial image is then segmented on a pixel-by-pixel basis in order to generate approximate images of the two components. The path lengths are then calculated through the two images using reprojection techniques. Error projections are then formed from the reprojections and added to the projection data that was used to form the initial image. A second-order image is then reconstructed from the new projection data. In a variation of the previous two steps, the error projections are reconstructed and the resulting image is added to the initial image to form the second-order image. If the level of polychromatic correction is sufficient, then the algorithm is complete. If not, the above procedure is repeated.

The use of reprojection is not limited to polychromatic correction algorithms. The paper "An Algorithm for the Reduction of Metal Clip Artifacts in CT Reconstructions," by G. H. Glover and N. J. Pelc, in Medical Physics, Vol. 8, No. 6, Nov. 1981, presents a method to remove the artifacts caused by metal clips using reprojection as part of their algorithm. The paper "A Simple Computational Method for Reducing Streak Artifacts in CT Images," by G. Henrich, in Computed Tomography, Vol. 4, 1981, describes an algorithm that can be used to remove streaks such as those caused by partial volume artifacts.

The polychromatic-, metal clip-, and streak-artifact correction algorithms described in the prior art above have not been implemented commercially because the reprojection step has been extremely time-consuming. The prior art reprojection methods have been too slow because they relied upon the inherent reprojection step incorporated in the reconstruction algorithms based on algebraic techniques. The slowness of the prior art reprojection systems and an attempted solution are highlighted in a paper "Algorithms for Fast Back- and Reprojection in Computed Tomography," by T. M. Peters, in IEEE Transactions on Nuclear Science, Vol. NS-28, No. 4, Aug. 1981. The paper presents a method that uses a modified backprojector to obtain reprojections. The problem with this system is that the modifications radically change the hardware of a backprojector and thus the system is not readily applicable to commercial applications. The system requires means to reverse the normal data flow through the backprojector, resulting in reprojections at the normal input of the unit. In addition, the resulting reprojections are of poor quality and require complex corrections in order to be used with an artifact correction algorithm.

Accordingly there is a long-standing need to improve the speed of systems that utilize reprojection. There are two approaches to reduce the processing time.

The first method, as presented in the related applications, is to provide for faster reprojection systems. The second approach is to reduce the processing time by using an existing reprojection system with pre- and post-processing subsystems added to enhance the operation of the reprojector.

The second approach used to reduce the processing time in systems that utilize reprojection is highlighted in U.S. Pat. No. 4,222,104. This prior art teaches that the reprojection system can reproject data along paths that do not correspond to the paths taken in the actual data collection system. Included within this prior art is the technique to reproject at fewer paths than the original data set. This latter step can be achieved because the information obtained from the reprojections has lower spatial resolution than the data used to form the initial image. This invention extends the basis of this prior art to new techniques to optimize the use of the reprojection system.

This invention presents systems that preprocess the image data presented to the reprojector and systems to postprocess the data obtained at the output of the reprojector.

BRIEF DESCRIPTION OF THE INVENTION

According to a preferred embodiment of the invention, a system for reprojecting images is provided; said system comprising:

means for reducing the size of a digitized image, and means for reprojecting said reduced image.

In another embodiment of the invention, a system is provided for reprojecting images when the image is obtained via backprojection; said system comprising:

means for selecting a portion of the data presented to the backprojector as input to the backprojector, means for backprojecting said selected data, and means for reprojecting said backprojected selected data.

In another embodiment of the invention, a refinement of the above embodiment is provided; said refinement comprising:

means for reconstructing images smaller than would be used for normal reconstructions.

In yet another embodiment of the invention, a system is provided for reprojecting images in which the projections are subsequently backprojected; said system comprising:

means to reproject an image, means to backproject said reprojected data; said backprojection being smaller than would be used for normal backprojections, and means to expand the resulting backprojected image.

The above subsystem reduce the processing time in systems utilizing reprojection methods so that commercial artifact correction systems can be implemented.

BRIEF DESCRIPTION OF THE DRAWINGS

The above mentioned and other objects and features of the invention will be better understood in conjunction with the following description of the invention taken in conjunction with the accompanying drawings, wherein:

FIG. 1 is a block diagram showing a prior art embodiment of a reprojection system used to correct polychromatic artifacts;

FIG. 2 is a block diagram of the reprojection system shown in FIG. 1 with a reducing system used as a preprocessor;

GENERAL DESCRIPTION

Figure 3:
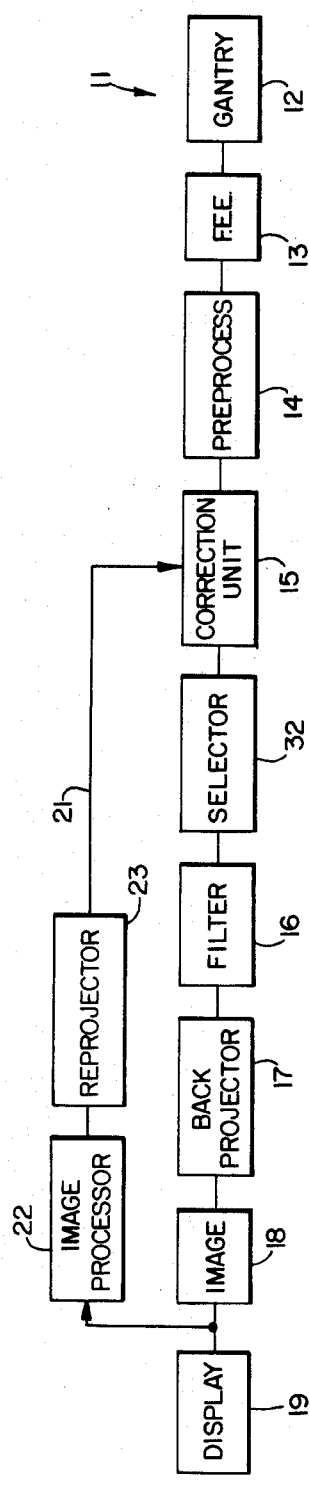
FIG. 3 is a block diagram of the reprojection system shown in FIG. 1 with a selection unit used as reprocessing unit to the filter.

The CT Scanner system 11 of FIG. 1 comprises the gantry 12. The subject is exposed to radiation in the gantry 12 and the radiation is detected after traversing the subject. The detected signals are treated in the block 13 labelled FEE for Front End Electronics. The electrical signals are preprocessed by the processor 14. The output signals of 14 are called projections. The output of 14 is passed through to the correction unit 15. The unit performs a first-order polychromatic correction on the projections in order to generate the initial image.

The output of the correction unit 15 is passed to the filter 16. The filtered projections are backprojected by backprojector 17. The output of the backprojector is passed in the form of a digitized image in matrix 18. The matrix of digitized data is used to provide images on display device 19.

Polychromatic error corrections are provided in the feedback loop 21 extending from the output of the backprojector 17 to the polychromatic error correction unit 15. In the polychromatic correction mode, the output of feedback loop 21 is combined with the output of preprocessor 14 and then passed to the filter 16.

The feedback loop 21 contains processing unit 22 and the reprojector 23. Processing unit 22 is designed, in a preferred embodiment, to distinguish between pixels of bone or soft tissue. The output of unit 22 is connected to the reprojector 23.

The information obtained from the reprojections may have lower spatial resolution than the initial image. This fact can be used to add pre- and post-processing units that can decrease the speed requirements of other units in an artifact correction system.

The reprojection time is directly related to the number of pixels in the initial image presented to the reprojector. Because of the reduced spatial resolution required in the reprojected data, it has been found that the initial image presented to the reprojector can be reduced via pixel selection or averaging so as to reduce the number of pixels presented to the reprojector, thus decreasing the time required to obtain reprojections.

In FIG. 2, FIG. 1 is repeated with the addition of image reduction unit 31. The image is reduced via 31 prior to processing by 22 and reprojection by 23.

In an artifact correction system, the initial image is often not presented to the end-user of the system. Thus the initial reconstruction system can be modified to recognize that the initial image is used for artifact correction. The resulting image will be eventually reprojected where the resolution requirements of the image are less strict. The result of this new process is that the initial reconstruction time can be reduced.

One method to modify the generation of the initial image is shown in FIG. 3. FIG. 3 is a repetition of FIG. 1 with the addition of a selection subsystem 32. The output of 15, projections, are selected so that only a portion of the projections and a portion of the samples of each projection are passed to the filter unit 16. The use of selector 32 reduces the filtration and backprojection time required to obtain the initial image. The selector is effectively bypassed when the corrected projections are transmitted to the backprojector.

In a normal backprojection system, the size of the resulting image is controllable. The size of the image presented to the user is much larger than required by the artifact correction system. Thus the control unit for the backprojector (not shown) can be modified so that when the reconstruction subsystems are operated in order to obtain the initial image, the size of the initial image can be smaller than the size of an image presented to the display system. Here again, the corrected image is normal size.

Figure 4:
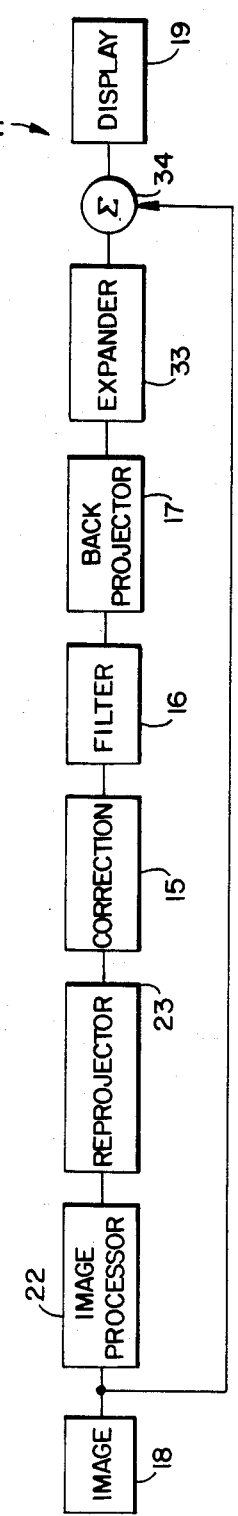
FIG. 4 is a block diagram showing an embodiment of a reprojection systems used to correct polychromatic artifacts wherein the reprojections are reconstructed and then added to the initial image via an expansion post-processing unit.

A second system configuration for artifact correction, as presented in the prior art, is shown in FIG. 4 with the addition of unit 33 which is part of this invention.

An initial image 18 is processed by unit 22 and then reprojected by 23. The reprojections are corrected by 15 and then filtered and backprojected by units 16 and 17, respectively. The prior art teaches that the size of the reconstruction obtained from the original projections or corrected reprojected data is the same as the size of the image at 18. In this situation, the expansion unit 33 can be bypassed and the reconstructed image can be added directly to the initial stage via 34 and displayed by 19.

However, because of the lower spatial resolution requirements, the image of the corrected reprojections can have a size smaller than the corrected image. In this case, the output of the backprojector has to be expanded via interpolation unit 33 so that the size matches that of the initial image. After the expansion, the expanded image is added to the initial image by unit 34 and then displayed on 19.

While the principles of the invention have been explained in connection with specific methods and equipment, it should be understood that the disclosure has been made by way of example only. Numerous changes can be made to the example given without departing from the spirit and scope of the invention as defined in the accompanying claims.

What is claimed is:

1. An arrangement for improving the processing time for systems that include reprojection means, said reprojection means reprojecting initial image data to obtain reprojections for use in correcting for polychromatic artifacts in diagnostic medical images of a subject, said arrangement comprising:
   (a) scanning means for directing radiation through said subject and detecting an intensity distribution of the radiation traversing the subject;
   (b) means for providing a set of original projections derived from the detected intensity distribution;
   (c) back-projector means for back-projecting said set of original projections to provide an original amount of initial image data for an initial image;
   (d) image processor means for processing a reduced amount of said initial image data into initial image correcting data based on at least two or more constituent tissues having different energy dependent radiation attenuation characteristics;
   (e) reprojector means for converting a reduced amount of said initial image correcting data into correcting reprojections;
   (f) means separate from said reprojector means for reducing the original amount of initial image data supplied to said image processor means to speed up the correction operations of said image processor and said reprojector while maintaining the original amount of initial image data; and
   (g) correction means for connecting said correcting reprojections to said back-projector means to provide image correcting data to correct said initial image data and to thereby provide corrected image data having reduced polychromatic artifact data but having an unreduced amount of image data equal to the amount in said initial image.

2. An arrangement for improving the processing time for systems that include reprojector means, said reprojector means reprojecting image data to obtain reprojections for use in correcting for polychromatic artifacts in diagnostical medical images of a subject, said arrangement comprising:
   (a) scanning means for directing radiation through said subject and detecting an intensity distribution of the radiation traversing the subject;
   (b) means for providing a set of original projections derived from the detected intensity distribution;
   (c) back-projector means for back-projecting said set of original projections to provide an original amount of initial image data for an initial image;
   (d) image processor means for processing a reduced amount of said original amount of initial image data into reduced initial image correcting data based on at least two constituent tissues having different energy dependent radiation attenuation characteristics;
   (e) reprojector means for converting said reduced image correcting data into correcting reprojections;
   (f) means separate from said reprojector means for reducing the initial image data supplied to said image processor means to speed up the operation of said image processor and reprojector means during the correction process while maintains the original amount of initial image data for use in the image display;
   (g) correction means for combining said correcting reprojections and said set of original projections to provide a set of corrected projections, having the same number of projections as said set of original projections; and
   (h) means for connecting said set of corrected projections to said back-projector means to provide image correcting data having the original amount of initial image data to correct said initial image data.

3. A method for improving the processing time for systems that include reprojector means for correcting for polychromatic artifacts in computerized tomographically obtained images, said method include the steps of:
   (a) directing radiation through a subject;
   (b) detecting an intensity distribution of the radiation traversing the subject;
   (c) deriving a set of original projections from said detected intensity distribution;
   (d) back-projecting said set of original projections to provide an original amount of initial image data;
   (e) reducing the amount of said original amount of initial image data;
   (f) processing said reduced amount of initial image data to provide reduced initial image correcting data;
   (g) reprojecting said reduced amount of initial image correcting data to provide a set of correcting reprojections, said set of correcting reprojections having less reprojections than the number of projections in the set of original projections;
   (h) using said set of correcting reprojections to minimize polychromatic artifacts; and
   (i) combining the set of correcting reprojections and the set of original projections to obtain a set of correcting projections having substantially the same number of projections as said set of original projections, back projecting said set of correcting reprojections to obtain correcting image data, having the original amount of data as said initial image data.

4. An arrangement for improving the processing time of systems that include reprojector means for generating reprojections used to reduce polychromatic artifacts in computerized tomographically (CT) produced images of a subject, said arrangement comprising:
(a) means for directing radiation through said subject;
(b) means for detecting a radiation intensity distribution of the radiation traversing the subject;
(c) means for providing a set of original projections derived from the detected radiation intensity distribution;
(d) means for selecting only certain projections of said set of original projections;
(e) back-projector means for back projecting said selected certain projections of said set of original projections to provide a correction image having reduced data;
(f) means for processing said correction image to provide correction data;
(g) means for reprojecting said correction data to provide correction reprojections;
(h) means for combining said correction reprojections and said projections to provide a set of corrected projections having substantially the same number of projections as said set of original projections; and
(i) means for connecting said set of corrected projections to said back projector means to provide a corrected image.

5. A method for improving the processing time of systems that include reprojector means for generating reprojections used to reduce polychromatic artifacts in computerized tomographically (CT) produced images of a subject, said method comprising the steps of:
(a) directing radiation through said subject;
(b) detecting a radiation intensity distribution of the radiation traversing the subject;
(c) providing a set of original projections derived from the detected radiation intensity distribution;
(d) selecting only certain projections of said set of original projections;
(e) back projecting said selected certain projections of said set of original projections to provide a correction image having reduced data;
(f) processing said correction image to provide correction data;
(g) reprojecting said correction data to provide correction reprojections;
(h) combining said correction reprojections and said projections to provide a set of corrected projections having substantially the same number of projections as said set of original projections; and
(i) means for connecting said set of corrected projections to said back projector means to provide a corrected image.

6. An arrangement for improving the processing time of systems that include reprojector means for generating reprojections used to reduce polychromatic artifacts in computerized tomographically (CT) produced images of a subject, said arrangement comprising:
(a) means for directing radiation through said subject;
(b) means for detecting a radiation intensity distribution of the radiation traversing the subject;
(c) means for providing a set of original projections derived from said detected radiation intensity distribution;
(d) back-projecting means for back projecting said set of original projections to form initial image data;
(e) image processor means including data compression means for providing compressed image correcting data;
(f) reprojector means for providing compressed image correcting reprojections;
(g) means for connecting said compressed image correcting reprojections to said back projector means to obtain compressed image correction data;
(h) means for expanding said compressed image correction data to provide image correction data; and
(i) means for combining said image correction data and said image data to provide a corrected image.

7. A method for improving the processing time of systems that include reprojector means for generating reprojections used to reduce polychromatic artifacts in computerized tomographically (CT) produced images of a subject, said method comprising the steps of:
(a) directing radiation through said subject;
(b) detecting a radiation intensity distribution of the radiation traversing the subject;
(c) providing a set of original projections derived from said detected radiation intensity distribution;
(d) back projecting said set of original projections to form initial image data;
(e) processing said initial image data to obtain compressed initial image data;
(f) processing said compressed data to provide compressed image corrected data;
(g) reprojecting said compressed image correcting data to provide compressed image correcting reprojections;
(h) connecting said compressed image correcting reprojections to said back projector means to obtain compressed image correction data;
(i) expanding said compressed image correction data to provide image correction data;
(j) combining said image correction data and said initial image data to provide corrected image data; and
(k) using said corrected image data to provide a corrected image.

* * * * *